(12) United States Patent
Bennett

(10) Patent No.: US 6,706,137 B2
(45) Date of Patent: Mar. 16, 2004

(54) CARPET SEAM COOLING

(76) Inventor: Daniel Paul Bennett, 632 Cedar Level Rd., Hopewell, VA (US) 23860

( * ) Notice: Subject to any disclaimer, the term of this patent is extended or adjusted under 35 U.S.C. 154(b) by 0 days.

(21) Appl. No.: 10/145,047

(22) Filed: May 14, 2002

(65) Prior Publication Data

US 2002/0170658 A1 Nov. 21, 2002

Related U.S. Application Data

(60) Provisional application No. 60/291,013, filed on May 16, 2001.

(51) Int. Cl.[7] ................... B30B 15/06; B29C 35/16
(52) U.S. Cl. ................. 156/304.7; 156/304.1; 156/304.6; 156/391; 156/498; 38/2; 38/70
(58) Field of Search ................ 156/304.7, 498, 156/304.1, 304.4, 304.6, 391, 580; 34/92; 38/2, 1 R, 69, 70, 71

(56) References Cited

U.S. PATENT DOCUMENTS

| | | | | |
|---|---|---|---|---|
| 3,914,097 A | * | 10/1975 | Wurl ........................... 432/59 |
| 4,584,040 A | * | 4/1986 | Anderson ................... 156/152 |
| 4,699,686 A | * | 10/1987 | Franke ........................ 156/579 |
| 4,780,173 A | * | 10/1988 | Wentz ........................ 156/574 |
| 4,943,222 A | * | 7/1990 | Nathoo ........................ 425/89 |
| 5,089,080 A | * | 2/1992 | Ramirez et al. ............ 156/498 |
| 5,210,394 A | * | 5/1993 | Kerremans ................. 219/245 |
| 5,221,200 A | * | 6/1993 | Roztocil et al. ............. 432/59 |
| 6,302,178 B1 | * | 10/2001 | Givens ........................ 156/579 |
| 6,367,535 B1 | * | 4/2002 | Chouinard ................. 156/576 |
| 6,421,939 B1 | * | 7/2002 | David et al. .............. 156/304.4 |

* cited by examiner

*Primary Examiner*—Richard Crispino
*Assistant Examiner*—Sue A. Purvis

(57) ABSTRACT

A tool and method for bonding two carpet pieces by use of a vacuum which forces air to move upwardly through the carpet and to cool the hot glue adhesive. The invention goes beyond providing a uniquely strong bond by leveling the carpets on both sides of the bond seam. Thus it also has the ability to bond a thin side of carpet with a thicker side of carpet because of leveling of the carpet on both sides of the bond seam thus hiding the seam more perfectly (many times when a carpet manufacturer shears a carpet one side will be thicker than the other side). Alternately, thin carpets may be bonded without risk of having a weak bond. When several carpets are bonded together with multiple seams, the carpet may be stretched more than conventionally bonded carpets due to the great strength of bonds made in accordance with this invention. All species of the invention enjoy a substantial savings in time needed for seaming.

9 Claims, 3 Drawing Sheets

Plan View

View A-A

View B-B

CARPET SEAM COOLING

REFERENCE TO RELATED APPLICATIONS

This application relates to provisional application No. 60/291,013 filed May 16, 2001.

BACKGROUND OF THE INVENTION

1. Field of the Invention

The present invention relates to installation of carpets on floors and walls and any other areas where carpet may be installed, and more particularly to method and apparatus for rapidly cooling carpet seams which have been formed using hot melt adhesives.

2. Description of the Prior Art

Installation of carpet in buildings frequently requires joining of one section of carpet to the next. This occurs for example where a stock section of carpet is too small to finish a room, corridor, or other space in which carpet is being installed. Two sections of abutting carpet are tightly joined by applying a strip of tape to the underside of both sections, wherein the tape overlaps each section. In order to present a professional finished appearance to the installation, it is necessary to draw two joined sections tightly to one another so that the seam is imperceptible to observers.

U.S. Pat. No. 4,605,253, issued to Martin I. Anderson on Aug. 12, 1986, sets forth a mechanical roller device intended to draw sections of carpet together. U.S. Pat. No. 4,780,173, issued to Kenneth W. Wentz on Oct. 25, 1988, sets forth a pressing tool, which exploits the body weight of the installer and brings the same to bear on the carpet. These and like devices assist in maintaining the two sections together, but fail to address a subsequent problem. The tape conventionally utilizes a hot melt adhesive, which permeates each section of carpet when it is heated and installed. If no intervention is undertaken by the installer, it usually takes about 30 minutes for the adhesive to cool sufficiently to bond the joined sections of carpet securely to the tape and to each other. It is necessary to wait for the cooling of the carpet to assure that stretching of the carpet will not separate the two joined sections. This process entails economic loss for commercial carpet installers, since there is usually little to do while a seam is cooling. Because commercial installers typically work in teams of several people, economic losses mount quickly during this phase of installation of carpet.

The prior art has recognized this problem and has proposed apparatus to hasten cooling of the hot melt adhesive. U.S. Pat. No. 5,089,080, issued to Andrew Ramirez et al. On Feb. 18, 1992, describes a device for discharging a cooling gas over carpet seams.

While this approach does indeed hasten cooling times, it entails several drawbacks. One is that the device requires a supply of chilled or alternatively, compressed gas. If a special gas such as carbon dioxide is employed, it must first be obtained and stored. This adds to the cost and to the equipment at the job site. Ramirez et al. suggest that compressed air may be utilized, chilling occurring upon expansion when pressure is released. However, even compressed air entails additional expenses. Either it must be obtained and stored in a suitable pressurized container, or else a compressor must be brought to the job site. Both situations entail additional expense and add to steps, which must be preformed to install carpet.

Other drawbacks include potential impairment of the installation or of the appearance thereof. Temperature extremes which accompany the chilled high-pressure gas approach may cause the hot melt adhesive to cool unevenly, thereby distorting a previously ideal appearance. Furthermore, discharge of high-pressured gas against the carpeting acts to a slight degree to urge the adhesive away from the overlaying carpet sections. An improvement in carpet seam forming which does not impair the final appearance of the installation remains a need in the commercial carpet installation industry.

SUMMARY OF THE INVENTION

The present invention provides a carpet tool for bonding two carpet sections comprising, a flat bottom chamber positionable on top of the carpet, apertures through the flat bottom of the chamber, and vacuum means for pulling air up through the apertures of the flat bottom chamber.

The present invention provides a method for bonding carpet sections with a hot glue adhesive comprising, abutting the carpet sections, applying hot melt adhesive to span the joint between the two carpet sections, applying a vacuum at the top of the two sections of carpet to induce air flow within the carpet and cooling the hot melted adhesive.

The present invention improves over the prior art in effectiveness, cost, and reduced time of cooling. In the present invention, vacuum is employed to draw ambient air up through freshly seamed carpeting. An effective degree of vacuum is easily achieved by commercial apparatus incorporating little more than a powered fan. Vacuum thereby obtained is advantageously brought to bear up through the carpeting through a body exposing slots or apertures to the carpeting, which slots or apertures are specially adapted for maximal effectiveness in applying vacuum evenly up through the carpet. The vacuum utilized in pulling air up through the carpet greatly reduces the temperature of said air due to the simple fact that when air is vacuumed through a restricted area, the air becomes greatly cooled. The present invention allows the carpet to be cooled preferably in about one minute and more preferably in about five minutes time compared to not using any means to cool the seam which would normally takes over thirty minutes of time. The present invention also keeps the joined carpet sections from cooling unevenly thus keeping the seam from looking deformed as it does many times due to the carpet setting up unevenly in the glue due to traffic on the seam.

This arrangement overcomes the tendency of the prior art to cool taped seams unevenly. Therefore, the final installation enjoys unimpaired appearance. Costs are lowered since compressed air and other pressurized sources of gas cost considerably more than commercially available vacuum apparatus. Time typically required for cooling of a newly formed seam in commercially available carpeting to the point that it will resist distortion by subsequent power stretching is reduced from half an hour, where no expedited cooling is utilized, to about five minutes and depending on the thickness of the carpet to about one minute.

Due to the tremendous suction applied to the carpet, this present invention pulls the carpet fibers up and combs, shapes and correctly resets the carpet fibers at a perfectly even height so the seam looks immaculate even on plush carpet while at the same time preventing the fibers from becoming stuck in the glue.

Accordingly, it is one object of the invention to expedite cooling of newly formed hot melt adhesive taped seams of carpet joints.

It is another object of the invention to minimize cost, bulk, weight, and complexity of apparatus used for cooling seams.

It is a further object of the invention to achieve even cooling of newly formed seams.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 2:
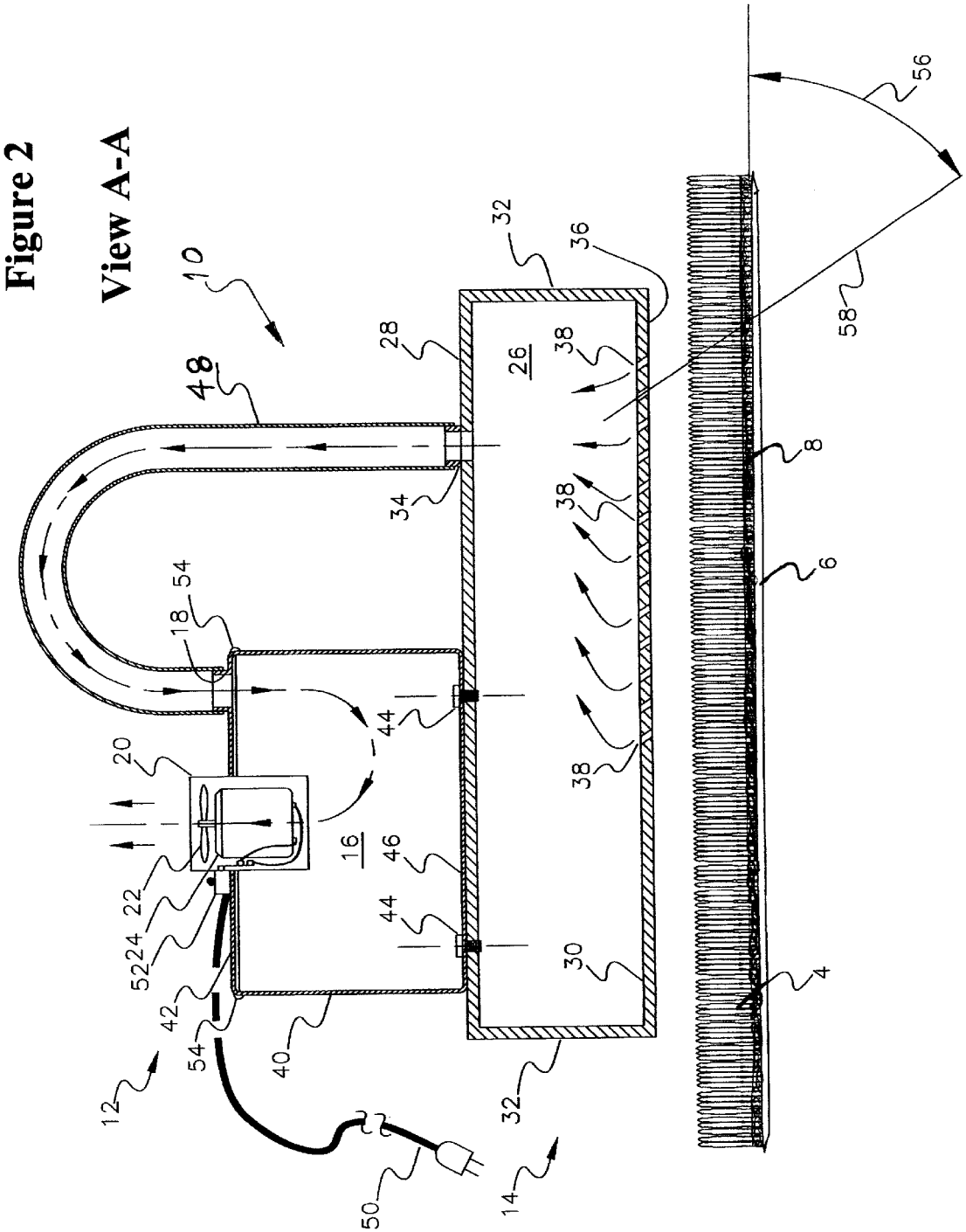
FIG. 2 is an environmental, side elevational, cross sectional view of apparatus according to the invention.

FIG. 2 of the drawings shows an apparatus 10 for expediting cooling reinforced seam joints of carpeting by inducing ambient air to pass over the formed seam joint by applying vacuum to the carpeting. As employed herein, vacuum will be understood to be partial vacuum or alternatively stated, pressures below those of the prevailing atmospheric pressure to a degree establishing a pressure differential sufficient to cause ambient air to flow upward through the carpet and past the seam joint at sufficient rates as to effect cooling.

The carpeting includes a first section of carpet 4, and joint tape 6 bearing hot melt adhesive 8. Joint tape 6 is conventional, and conventionally joins carpet sections 4 and 2 (not shown in FIG. 2 but shown in FIG. 3) when adhesive 8 is heated to the point of melting, permeating carpet sections 2 and 4, and subsequently cooling and hardening.

Apparatus 10 comprises a vacuum generating device 12 and an interface body 14. Device 12 comprising a chamber 16 having a restricted inlet opening 18, an outlet opening 20, and a fan 22 arranged to evacuate air from chamber 16 and discharge evacuated air through outlet opening 20. An electric motor 24 is arranged to operate fan 22. Electric motor 24 is disposed in heat exchange relation to air passing through vacuum generating device 12 when fan 22 operates.

Interface body 14 has a generally closed receptacle 26 bounded by upper, lower, and lateral walls 28, 30, 32. Upper wall 28 includes an outlet port 34. Lower wall 32 comprises a rigid, smooth, flat lower surface 36 bearing apertures 38. Apertures 38 may be of any suitable configuration, such as elongate slots or circular perforations. Inlet opening 18 of vacuum generating device 12 is disposed in operable communication with receptacle 26 of interface body 14 such that vacuum generated by fan 22 will induce air to be drawn through apertures 38 and into chamber 16 of vacuum generating device 12.

Vacuum generating device 12 may be for example a commercially available vacuum cleaner of the type popularly known as a shop vacuum. A shop vaccum typically includes a generally cylindrical canister 40 and a removable attached top 42. Fan 22 and motor 24 are permanently mounted to top 42. Top 42 also bears inlet opening 18 and outlet opening 20. Motor 24 is arranged to be exposed to air propelled into canister 40 and discharged there from such that motor 24 is cooled thereby.

Vacuum generating device 12 is suitably affixed to upper wall 28 by screws 44 which are passed through the bottom wall 46 of canister 40 and which engage upper wall 28. Screws 44 are representative of many types of attachment elements, which would be suitable for mounting canister 40 to interface body 14. It will be appreciated that mounting of canister 40 to upper wall 28 effects mounting of vacuum generating device 12 to interface body 14, although mounting can obviously be accomplished in other ways.

Vacuum developed within chamber 16, which is provided by canister 40 when a commercial shop vacuum provides vacuum generating device 12, is connected to receptacle 26 of interface body 14 by a suitable conduit such as flexible hose 48. Hose 48 may be furnished conventionally as part of a commercial shop vacuum, or may be provided as a separate component. Hose 48 is connected to inlet opening 18 at one end and to outlet port 34 of interface body 14 at the other end. It will be apparent then that responsively to vaccum being brought to bear on receptacle 26 and thus to one side of surface 36, air flows into interface body 14 through apertures 38, into chamber 16 through hose 48, past motor 24, then into the open atmosphere through outlet opening 20, as indicated by arrows, when the other side of surface 36 is passed over the carpet at sufficient proximity as to cause ambient air to flow in heat exchange relation relative to adhesive 8.

Preferably, vacuum-generating device 12 includes a suitable power cord and plug assembly 50 for ready connection to household AC electrical power, and a switch 52 for controlling motor 24. Latching clasps 54 secure top 42 to canister 40. Cord and plug assembly 50, switch 52, and clasps 54 are conventionally provided as part of commercially available shop vacuums, and therefore will not be set forth in greater detail herein.

It will be seen that apertures 38 pass through lower wall 32 such that they are oriented at a non-perpendicular angle to surface 36. This angle, indicated by arrow 56, is preferably in the range of thirty to forty-five degrees, and is taken between surface 36 and the central axis 58 of each aperture 38.

Figure 1:
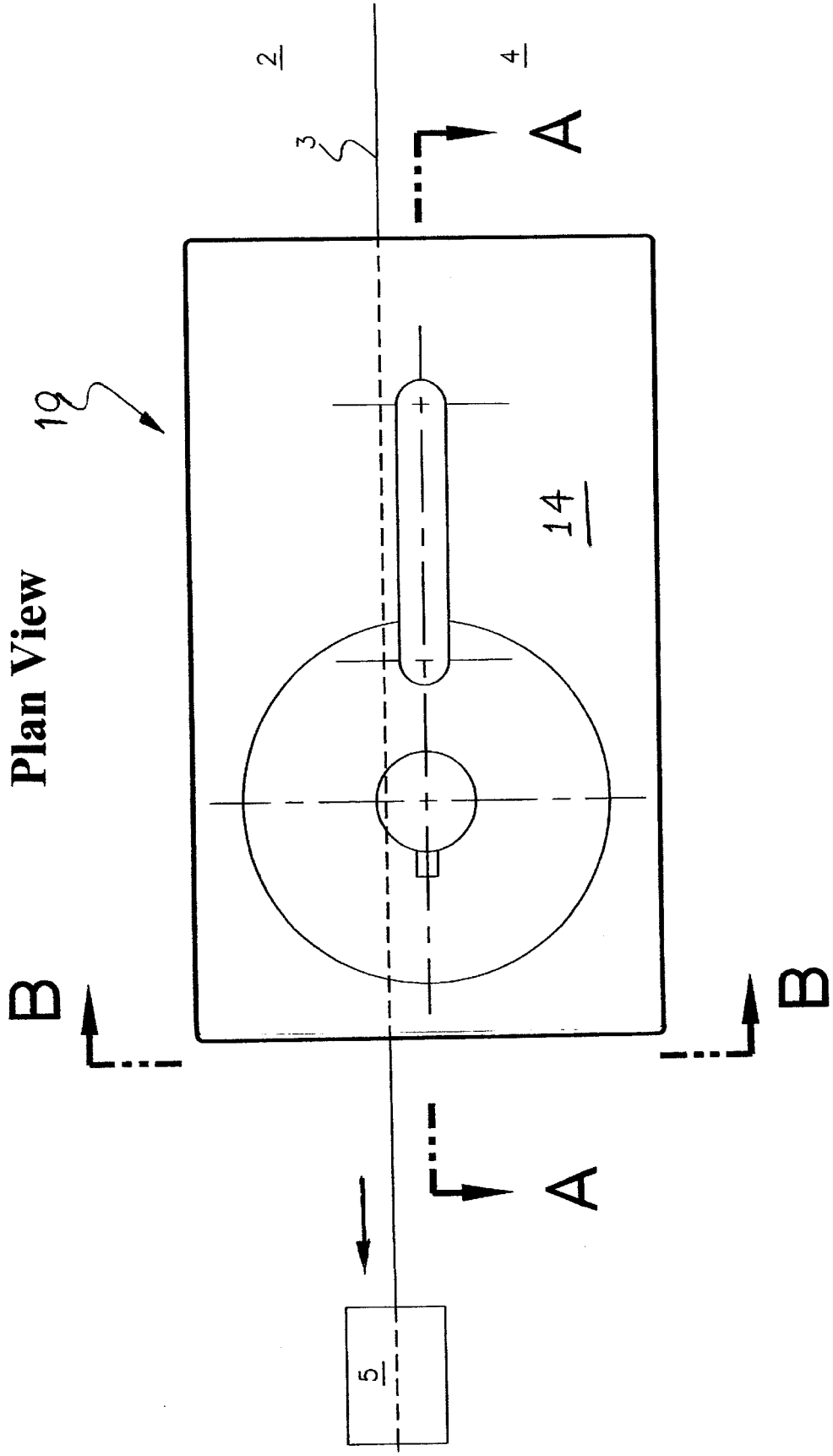
FIG. 1 is a diagrammatic, top plan environmental view of the apparatus of FIG. 2 in use.

Turning now to FIG. 1, method of use of apparatus 10 will be discussed. A seam joint 3 is conventionally formed by applying heat-melted adhesive tape 6 (see FIG. 2) to abutting sections 2, 4 of carpet such that tape 6 spans the joint (see FIG. 3). Tape 6 is heated sufficiently to melt adhesive 8 (see FIGS. 2 and 3) to cause adhesive 8 to permeate abutting sections 2, 4 of carpet. The step of heating will be understood to apply pressure if recommended by material suppliers and manufacturers, to promote permeation of the carpeting by adhesive 8.

Figure 3:
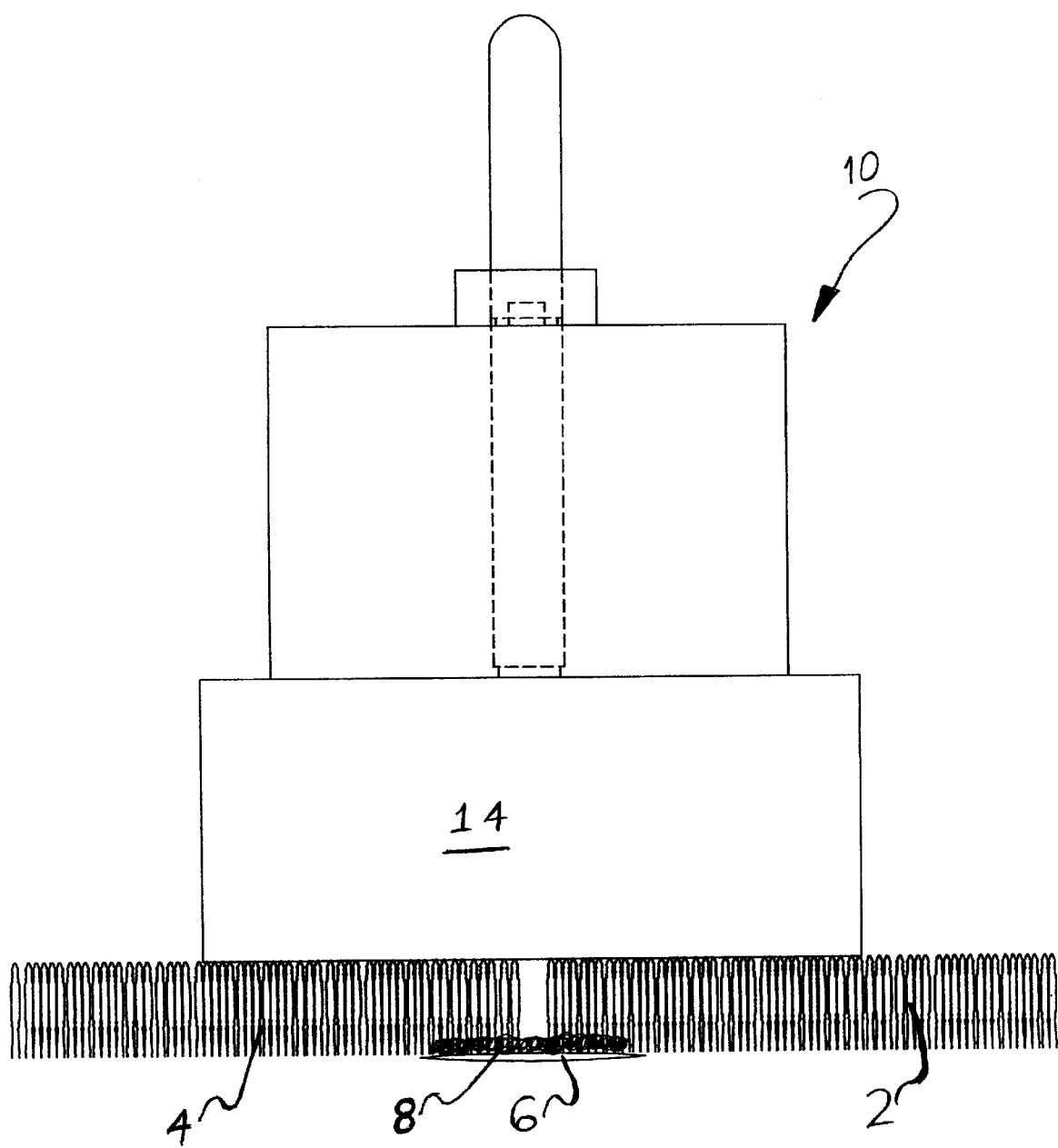
FIG. 3 is an environmental end view of the apparatus according to the invention.

Apparatus of applying tape 6 such as heating element 5 is shown passing over seam joint 3 in a direction indicated by arrow. Apparatus 10 is passed over seam joint 3 behind heating element 5 and in the same direction such that interface body 14 (see FIGS. 2 and 3) passes over and against the carpet, all the while operating the source of vacuum. This induces ambient air to pass over the formed seam joint 3 by applying vacuum to carpet sections 2 and 4, thereby cooling seam joint 3. Although it would be possible to apply vacuum near the bottom surface of the carpeting to induce air cooling, it is preferred to apply vacuum to the upper surface, as shown in FIGS. 1 and 3.

The invention may be regarded both as apparatus 10 and also as a method of forming reinforced seam joints of carpeting and cooling the latter by vacuum induced airflow.

What is claimed is:

1. A method for bonding carpet sections with a hot glue adhesive comprising:
    abutting the carpet sections,
    applying hot melt adhesive to span the joint between the two carpet sections,
    applying a vacuum at the top of the two sections of carpet to induce airflow within the carpet and cooling the hot melted adhesive.

2. The method of claim 1 wherein the two carpet sections are thin.

3. The method of claim 1 wherein the two carpet sections are of different thickness.

4. The method of claim 1 wherein the two carpet sections are full size and the sections after bonding are subjected to high tension through power stretching.

5. A carpet bonding system, including a tool for bonding two carpet sections together, the system comprising:
    abutting carpet sections including a hot melt adhesive strip which spans the two abutting sections,
    a tool for bonding the carpet sections wherein the tool includes a flat bottom chamber positionable on top of the carpet and spanning the two abutting sections and the adhesive strip, the flat bottom chamber of the tool includes apertures, and vacuum means attached to the tool for pulling air up through the apertures of the flat bottom chamber.

6. The system of claim 5, wherein the means for pulling the air attached to the tool is a vacuum chamber located on top of the flat bottom chamber.

7. The system of claim 5, wherein the means for pulling the air attached to the tool is a vacuum means located in an outlet port in the top of the flat bottom chamber.

8. The system of claim 5, wherein the apertures on the flat bottom chamber of the tool are slots slanted so that the upper part of the slots precedes the lower part of the slots.

9. The system of claim 5, wherein the means for pulling the air attached to the tool is a vacuum means located alongside the flat bottom chamber.

* * * * *